United States Patent [19]
Van Dijk et al.

[11] 3,851,177
[45] Nov. 26, 1974

[54] SCINTILLATION CAMERA WITH IMPROVED LINEARITY

[75] Inventors: Nicolaas Van Dijk, Zandvoort; Gerardus Huibrecht Kulberg, Amstelveen, both of Netherlands

[73] Assignee: G. D. Searle & Co., Chicago, Ill.

[22] Filed: Feb. 23, 1973

[21] Appl. No.: 335,327

[52] U.S. Cl. .............................. 250/366, 250/369
[51] Int. Cl. .............................................. G01t 1/20
[58] Field of Search ............ 250/363, 366, 369, 327

[56] References Cited
UNITED STATES PATENTS
| | | | |
|---|---|---|---|
| 3,509,341 | 4/1970 | Hindel et al. | 250/510 X |
| 3,591,806 | 7/1971 | Brill et al. | 250/366 |
| 3,594,577 | 7/1971 | Loveday | 250/369 X |

Primary Examiner—Archie R. Borchelt
Attorney, Agent, or Firm—Walter C. Ramm; Peter J. Sgarbossa; Charles H. Thomas, Jr.

[57] ABSTRACT

An Anger-type scintillation camera having analog circuitry in the form of seven correction generators each associated with one of a central seven of an array of nineteen photomultiplier tubes to compensate for spatial non-linearities in the camera. Each correction generator is active for scintillations produced by gamma ray interactions near its associated photomultiplier tube and produces correction signals which are added to the coordinate signals of an Anger-type camera to produce corrected corrdinate signals which represent more accurately the true spatial coordinates of the gamma ray interaction.

7 Claims, 10 Drawing Figures

SCINTILLATION CAMERA WITH IMPROVED LINEARITY

Anger-type scintillation cameras (U.S. Pat. No. 3,011,057) are in widespread use in many medical facilities throughout the world. Many improvements in camera performance have been made, most importantly in improving intrinsic spatial resolving ability, with resultant improvements in the diagnostic utility of the device. For example, an improvement in resolution was achieved in 1968 by substituting photomultiplier tubes with bialkali photocathodes having higher quantum efficiency. A very important additional improvement in resolution was achieved through the use of non-linear (threshold) preamplifiers as disclosed in a copending application of Kulberg and Muehllehner, Ser. No. 79,861, filed Oct. 12, 1970, now U.S. Pat. No. 3,732,419.

However, improvements in intrinsic spatial resolution of the Anger-type camera have accentuated one of its inherent characteristics: spatial non-linearity in converting scintillations into position coordinate electrical signals. This spatial non-linearity manifests itself in the following way: an output display of a uniform spatial distribution of gamma rays interacting with the scintillator (typically called a "flood image") comprises a non-uniform spatial distribution of dots having a characteristic denser clustering of dots in regions corresponding to locations of central areas of the central seven photomultiplier tubes in a hexagonal array of nineteen tubes. This denser clustering results from the observed phenomenon that a gamma ray interaction (i.e., a scintillation) at a particular location in the scintillator near the position of the central axis of a particular one of the central seven tubes results in a displayed dot at a location nearer the axis of the tube than the true location of the interaction. Thus dots tend to bunch up around the areas in the display corresponding to axes of the seven central photomultiplier tubes.

The various approaches which have been taken, to compensating for the inherent spatial non-linearity to produce a more uniform flood image fall into two general categories: (1) approaches which involve alteration of the light distribution from the scintillator to the photomultiplier tubes by modifications involving one or more of the scintillator, light pipe and photomultiplier tubes; and (2) approaches which involve modification of output signals from the camera. Examples of the first approach are the following:

1. A copending application of Spelha and Krueser, Ser. No. 111,409, filed Feb. 1, 1971, now U.S. Pat. No. 3,723,735, discloses painting all surfaces of the light pipe with a highly light absorbing paint except surfaces mating with the glass cover on the scintillator and the entrance windows of the photomultiplier tubes.

2. A published Dutch patent application No. 7,202,290 of Picker Corporation, dated Sept. 7, 1972, discloses seven relatively opaque light diffusing elements between the glass cover on the scintillator and the light pipe under each of the seven central photomultiplier tubes. Each element comprises twelve equally spaced spokes radiating from a hub positioned on a central axis of one of the tubes with alternate spokes pointing toward an axis of one of the surrounding six photomultiplier tubes.

3. A copending application of van Dijk, Ser. No. 335,026, filed Feb. 23, 1973, discloses embedding seven optically coated transparent cones in the light pipe under the seven central tubes to alter the distribution of light from gamma ray interactions depending upon the location of the interaction.

Examples of the second approach are the following:

1. A copending application of Muehllehner, Ser. No. 196,891, filed Nov. 9, 1971, now U.S. Pat. No. 3,752,982, discloses an approach involving correction of output signals from the camera based on correction factors derived from measurements of the non-linearity of the system at various locations on the scintillator. Correction is accomplished on either a one-event-at-a-time basis or after an uncorrected map has been stored in core memory in a digital data system.

2. A copending application of Jaszczak, Ser. No. 233,670, filed Mar. 10, 1972, now U.S. Pat. No. 3,746,872 discloses using a non-linear array of signal filter windows in conjunction with a scanning gamma ray filter simultaneously to improve resolution and spatial linearity of an Anger-type camera system at some sacrifice in sensitivity.

For some of the cited examples, it is possible to improve the intrinsic spatial resolution of the camera by locating the photocathodes of the photomultiplier tubes closer to the scintillator and, at the same time, compensate for the increased spatial non-linearity which would otherwise be produced by such alteration of scintillator-photomultiplier tube spacing.

A principal object of this invention is to provide an Anger-type scintillation camera in which improved spatial linearity is achieved by employing a plurality of correction signal generators, each associated with a central photomultiplier tube and operating in response to a gamma ray interaction near its associated tube to produce correction signals which are combined with coordinate signals from the camera to produce corrected coordinate signals more accurately representing the true coordinates of the gamma ray interaction.

A principal advantage of this invention is that the degree of correction applied to the camera coordinate signals may easily be varied electrically to compensate for observed variations in the degree of non-linearity from one production camera to the next. Other approaches to compensating for differences in degree of non-linearity involve much more difficulty, especially if changes in parameters of the detector head are required.

Other objects, features, and advantages of this invention will be apparent from a consideration of the following detailed description in conjunction with the accompanying drawings which are briefly described as follows:

FIG. 1 shows nineteen photomultiplier tubes PM1 to PM19 arranged in a hexagonal array and a X, Y coordinate system which has its origin at the central axis of PM10. The tubes PM1 to PM19 are regularly arrayed with respect to a crystal scintillator 10.

Figure 2:
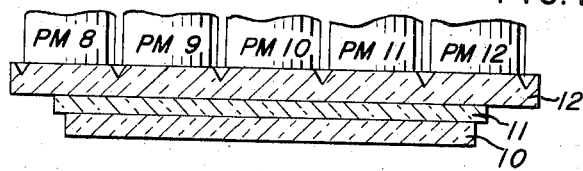
FIG. 2 is a partly sectioned view of the major components of an Anger-type detector.

FIG. 2 shows scintillator 10 covered by a glass cover 11 and a light pipe 12 mounted between glass cover 11 and the photomultiplier tubes of which PM8 to PM12 are shown. Scintillator 10 and glass cover 11 are typically mounted in a can (not shown) such that scintillator 10 is hermetically sealed. The functional operation of these components of an Anger-type detector are well known and need not be detailed here.

Figure 1:
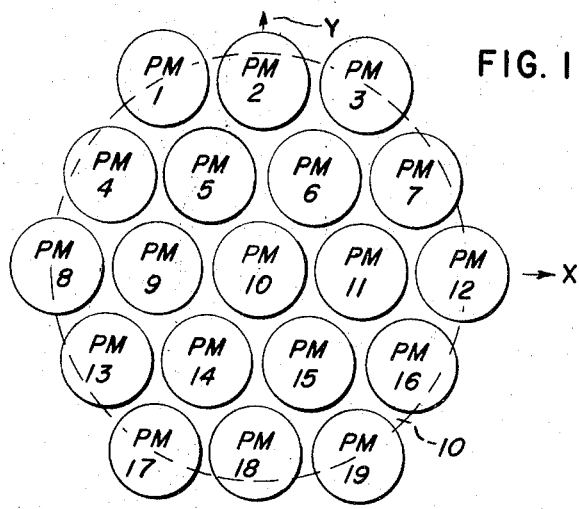
FIG. 1 shows a hexagonal arrangement of nineteen photomultiplier tubes in a typical Anger-type camera.
Figure 5:
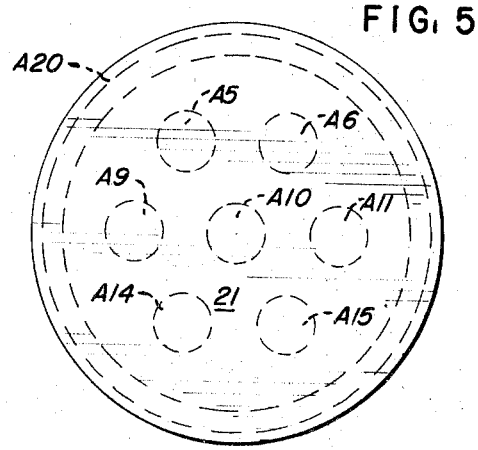
FIG. 5 is a representation of a display of a "flood image;"
Figure 3:
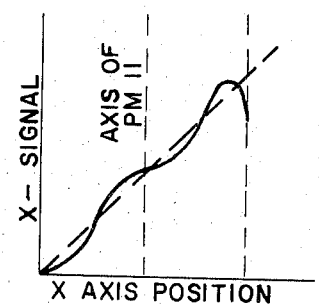
FIG. 3 is a graph which demonstrates spatial non-linearity of an Anger-type camera.

FIG. 3 shows graphically the spatial non-linearity of an Anger-type camera. The abscissa represents the X-axis position of a highly collimated source of gamma rays and the ordinate represents the magnitude of the X-signal from the camera at each X-axis position. A linear system would follow the dashed straight line. A representative curve for an Anger-type camera is the solid line which has a smaller slope in the vicinity of the axes of the photomultiplier tubes and a larger slope at regions about midway between axes of photomultiplier tubes. As a result a "flood image" as depicted in FIG. 5 has seven areas A5, A6, A9, A10, A11, A14, A15, of greater concentrations of dots corresponding to central regions of the seven central photomultiplier tubes. FIG. 3 shows that near the edge of crystal scintillator 10 the X-signal begins to decline, producing an image foldover. The result as shown in FIG. 5 is a ring-shaped area A20 of increased concentration of dots at the periphery of the "flood image." Walker U.S. Pat. No. 3,668,395 discloses an approach to increasing the useful imaging area of crystal scintillator 10 by suppressing gamma ray interactions at a portion of the outer edge which would produce coordinate signals corresponding to areas nearer the center of the crystal scintillator 10.

The greater concentrations of dots in the seven areas shown in FIG. 5 are often called "hot spots" because they mimic areas of greater concentration of gamma ray emitting material viewed by scintillator 10. These "hot spots" are of concern if they are clearly visible in image displays in diagnostic situations because they can also mimic areas of increased uptake of radiopharmaceutical which might be diagnostically significant.

Figure 4:
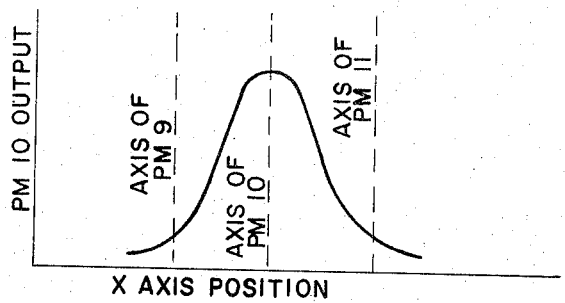
FIG. 4 is a graph of the output response from a single phototube as the source position changes.

FIG. 4 illustrates the form of a typical photomultiplier output response curve as the position of a collimated source of gamma rays is moved along a line intersecting the axis of the tube. In particular FIG. 4 illustrates the output of PM10 as a collimated source moves along the X-axis. It has been verified that the shape of this light distribution curve affects significantly the magnitude of the non-linear spatial response of an Anger-type camera. In one embodiment of this invention, this response curve is employed as a control in a very useful manner as will be detailed below.

Figure 6:
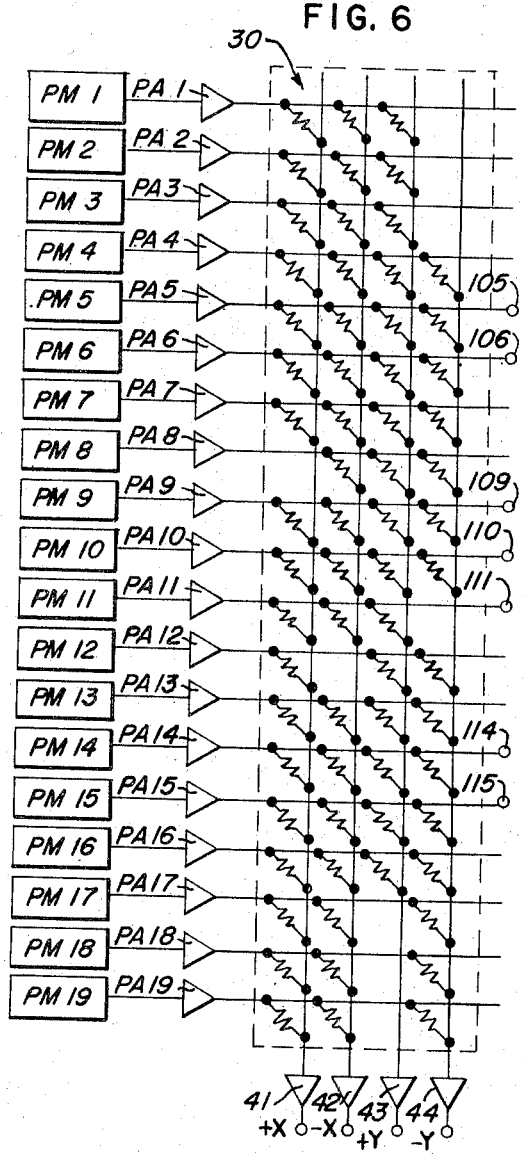
FIG. 6 is a schematic diagram of a portion of a typical Anger-type camera.

FIG. 6 shows typical circuitry for developing coordinate electrical signals from the array of photomultiplier tubes viewing crystal scintillator 10 (FIG. 2). Photomultiplier tubes PM1 to PM19 have outputs coupled individually to preamplifiers PA1 to PA19. Preamplifiers PA1 to PA19 are preferably threshold preamplifiers disclosed in the above-referenced Kulberg and Muehllehner patent application. Outputs from preamplifiers PA1 to PA19 feed a position matrix arrangement 30 which functions in a well-known manner to combine the outputs on four signal lines which feed summing amplifiers 41 to 44 such that output signals $+x$, $-x$, $+y$, $-y$, which represent coordinates of a gamma ray interaction are produced. Anger U.S. Pat. No. 3,011,057 shows a five line system with a separate signal line for an energy signal or Z signal. In the four line system shown in FIG. 6 the Z signal is developed in a well-known manner by summing the output signals $+x$, $-x$, $+y$, $-y$. Output signals $+x$, $-x$, $+y$, $-y$ represent position coordinates in the sense that the difference between $+x$ and $-x$ gives an x coordinate signal and, similarly, the difference between $+y$ and $-y$ gives a y coordinate signal.

Figure 7:
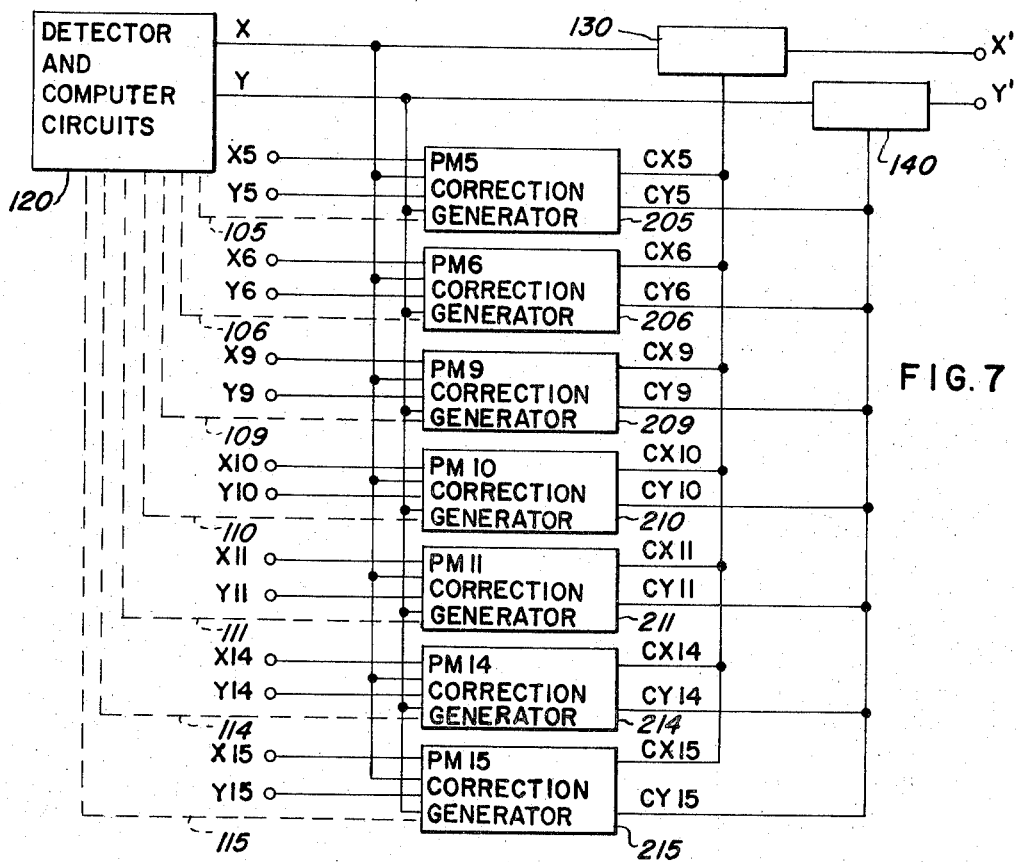
FIG. 7 is a block diagram illustrating generally an Anger-type camera according to this invention.

FIG. 7 illustrates in block diagram form general aspects of this invention. Anger-type detector and computer circuits 120 produce position coordinate signals $x,y$ in the usual manner. It is to be understood that position coordinate signals $x,y$ comprises either the initial $+x$, $-x$, $+y$, $-y$ signals or the final $x,y$ signals after subtraction has been performed. Seven correction generators, 205, 206, 209, 210, 211, 214, 215, each receive position coordinate signals $x,y$. Each correction generator is associated with a particular one of the central seven photomultiplier tubes PM5, PM6, PM9, PM10, PM11, PM14, PM15, and receives a pair of reference signals representing position coordinates of the axis of its associated photomultiplier tube. For example, PM5 correction generator 205 receives reference signals $x5$, $y5$ which represent the position coordinates of the axis of photomultiplier tube PM5. Each correction generator (e.g., 205) produces correction signals (e.g., $cx5$, $cy5$) for gamma ray interactions nearby its associated photomultiplier tube (e.g., PM5). Correction signals $cx5$, $cy5$ are combined with position coordinate signals $x,y$ in combining circuits 130, 140 to product corrected coordinate signals $x',y'$. Corrected coordinate signals $x',y'$ which represent more accurately the true position coordinates of the gamma ray interaction in scintillator 10 (FIG. 2) than did the initial position coordinate signals $x,y$. Dashed signal lines 105, 106, 109, 110, 111, 114, 115 indicate that correction generators optionally receive outputs from preamplifiers of associated photomultiplier tubes as control inputs.

The theory behind the operation of correction generators 205, 206, etc., is that, by comparing the initial $x,y$ position coordinate information developed by the Anger-type camera circuitry in the usual manner with reference signals representing position coordinates of the axis of the nearest of the central seven photomultiplier tubes, the difference in the respective position coordinates provides information on where the gamma ray interaction occurred with respect to that tube. If those comparative signals are multiplied by a factor which varies directly with the degree of non-linearity at that location, correction signals are produced which can be additively combined with the original position coordinate signals to produce corrected position coordinate signals. Since it is known that the degree of non-linearity is greatest for gamma ray interactions near a photomultiplier tube axis, it turns out that a version of the photomultiplier tube-preamplifier output signal which has a threshold cut-off of its own provides a useful control signal to supply the multiplying factor for the difference comparators. Alternatively, it should be apparent that a non-linear control signal as the multiplying factor can also be derived from the initial $x,y$ position coordinates signals and reference signals (e.g., $x5$, $y5$) themselves as will be detailed below.

Figure 8:
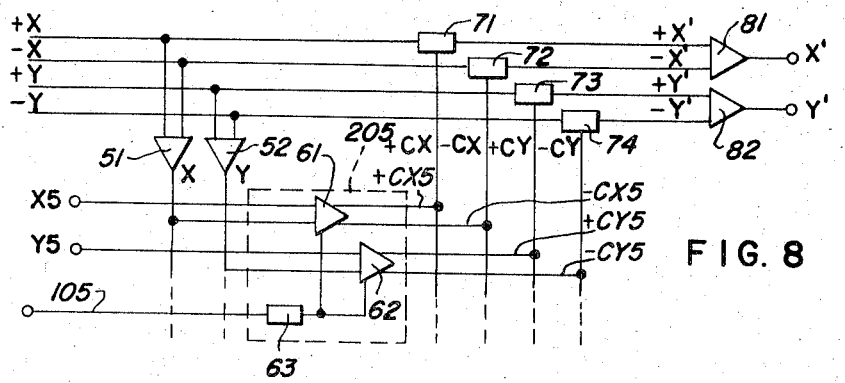
FIG. 8 is a block diagram illustrating one embodiment of this invention.
Figure 9:
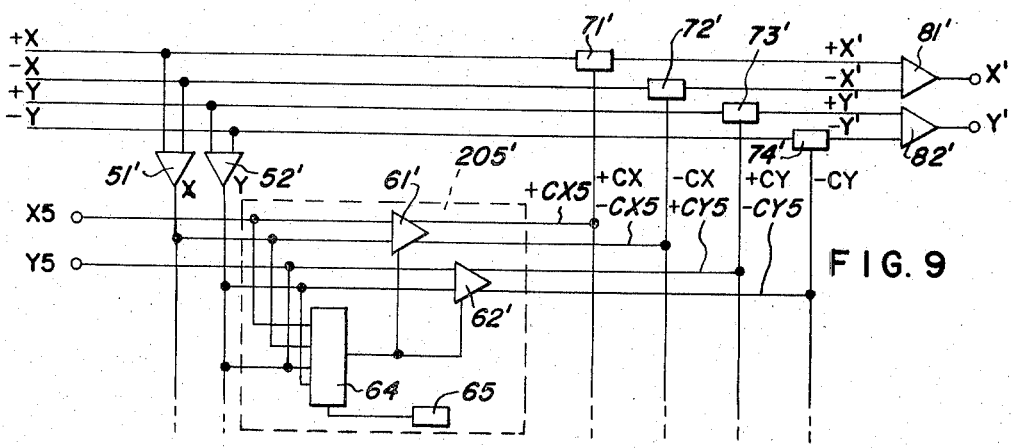
FIG. 9 is a block diagram illustrating an alternate embodiment of this invention.

The details of actual circuit implementation of this invention will vary considerably, depending upon 1) how the control signal representing degree of non-linearity is developed and 2) whether a five line or four line matrixing arrangement is used to develop position and energy (or pulse height) information. FIGS. 8 and 9 illustrate approaches to implementation for a four line system in which four correction signals are developed and combined with the four position signals and the difference circuits operate on the four corrected signals to produce the final $x',y'$ corrected coordinate signals.

As shown in FIG. 8, a pair of difference circuits 51 and 52 produce uncorrected $x,y$ signals from the $+x$, $-x$, $+y$, $-y$ signals. The $x$ signal serves as one input to difference circuit 61, and the $y$ signal serves as one input to difference circuit 62. Reference signals $x5$ and $y5$ serve as other inputs, respectively, to difference circuits 61 and 62. Output signals $+cx5$, $-cx5$ are equal in amplitude and opposite in polarity with the amplitude and polarity of each dependent on the difference between position coordinate signal $x$ and reference signal $x5$. Similarly, output signals $+cy5$, $-cy5$ are equal in amplitude and opposite in polarity with amplitude and polarity dependent on the difference between position coordinate signal $y$ and reference signal $y5$. Moreover, the signal on lead 105, which is the output of PA5 (FIG. 6) is fed through a threshold circuit 63; and assuming it passes threshold circuit 63, it controls the gain of both difference circuits 61 and 62. Thus, the magnitude of correction signals $+cx5$, $-cx5$, $+cy5$, $-cy5$ is also dependent on the magnitude of the output signal from PA5. Obviously, if the PA5 output is below the threshold setting of threshold circuit 63, the gain of difference circuits 61 and 62 will be zero and PM5 correction generator 205 will not provide any correction signals. Thus the threshold setting of threshold circuit 63 prevents PM5 correction generator 205 from acting on gamma ray interaction events not immediately in the vicinity of PM5.

It will be apparent from the distribution curve shown in FIG. 4 (the curve for PM5 is similar to the one shown for PM10) that the gain of difference circuits 61 and 62 is at a maximum for events on the axis of PM5 and decreases as events move away from the axis. This is in accord with the observation that the degree of non-linearity is greatest for events at or near the axis of a photomultiplier tube. Of course, for an event occurring at the coordinates of PM5, the outputs of difference circuits 61 and 62 will be zero. In general, as events occur at greater distances from PM5 the degree of correction will be less because the magnitude of the gain control signal will be less.

Only PM5 correction generator 205 is shown in FIG. 8 as it should be apparent that the other six correction generators would have the same characteristics. Each correction generator would have a threshold circuit set such that it produced correction signals only for gamma ray interaction events in the vicinity of its associated photomultiplier tube.

FIG. 9 shows an alternate embodiment which is similar to the embodiment of FIG. 8 except that a gain control signal is developed from the $x,y$ and $x5,y5$ signals themselves. A pulse generator 65 feeds a standard pulse to a function generator circuit 64 which couples a version of the standard pulse into difference circuits 61' and 62', with the magnitude dependent on the magnitudes of $x5$, $y5$, $x$, and $y$. Function generator circuit 64 has a response curve similar to a phototube response curve, i.e., it would pass the standard pulse maximally for events near the PM5 axis and decrease the amplitude of the pulse for events more remote from the PM5 axis.

Figure 10:
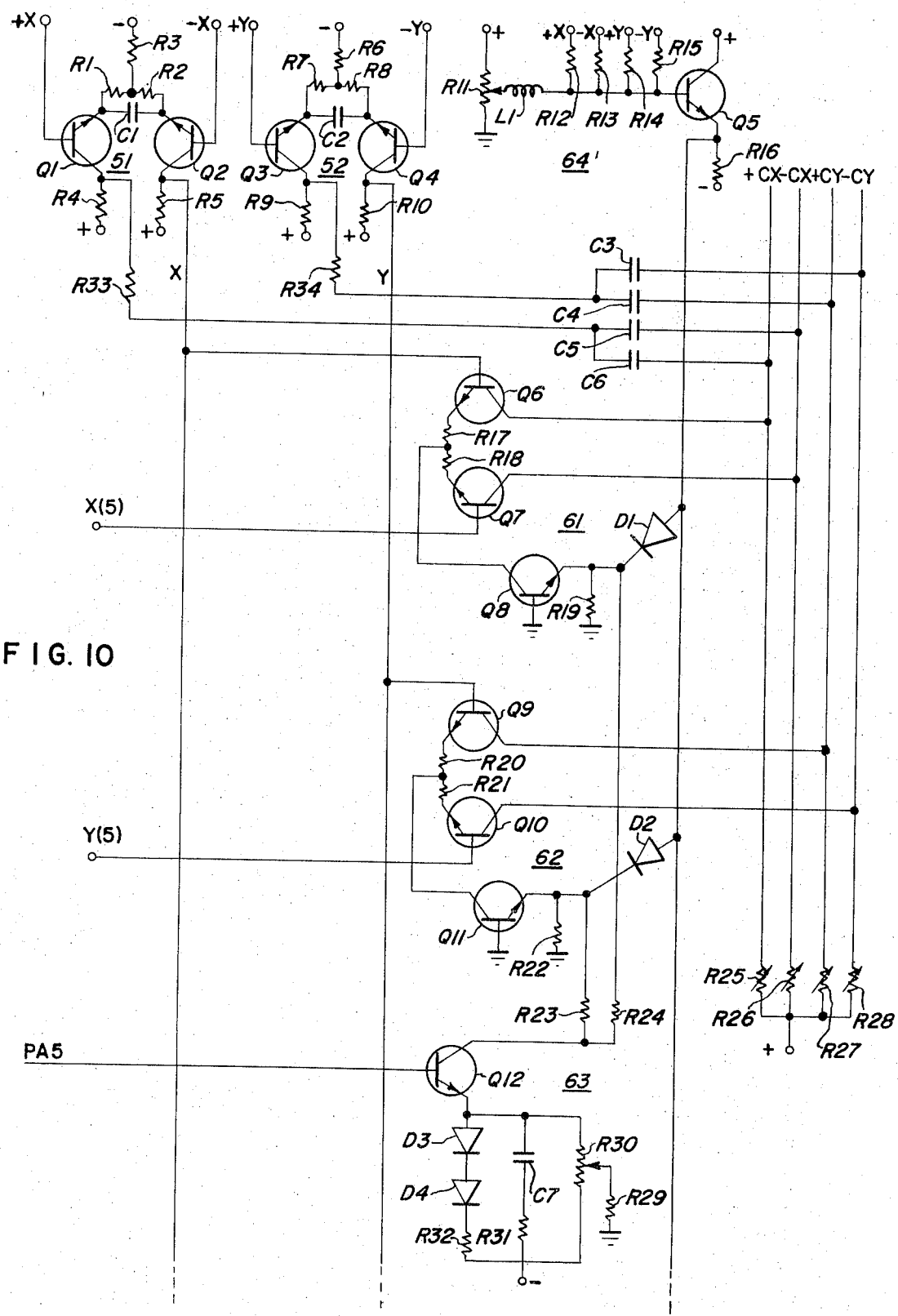
FIG. 10 is a circuit diagram illustrating in detail the embodiment of FIG. 8.

FIG. 10 shows detailed circuitry for the embodiment of FIG. 8 and includes a strobing circuit 64' which operates on the sum of $+x$, $-x$, $+y$, $-y$ signals to strobe each correction generator. The operation of the various difference amplifiers and threshold circuits are well known and need not be detailed here. Transistor Q5 in strobing circuit 64' is normally biased off by potentiometer R11 until a negative going pulse (the sum of $+x$, $-x$, $+y$, $-y$) at its base electrode turns Q5 on, which in turn, turns on gating transistors Q8 and Q11 to allow the gain control signal from PA5 to reach difference circuits 61 and 62, if it passes threshold circuit 63. Variable resistors R25 to R28 are used to control the magnitude of the correction applied and can be set to produce the proper amount of correction for each individual camera produced. Capacitors C3 to C6 and resistors R33 and R34 eliminate crosstalk when gating transistors Q8 and Q11 are off. Following is a list of component types and values for the circuit elements of FIG. 10.

| | |
|---|---|
| Transistors Q1 to Q12 | 2N3904 |
| Diodes D1, D3, D3 | IN916 |
| Resistors R1, R2, R7, R8, R17, R18, R20, R21, R30 | 470 |
| Resistors R3, R4, R5, R6, R9, R10, R12, R13, R14, R15, R33, R34 | 2.2K |
| Resistors R25, R26, R27, R28 | 390 |
| Resistors R19, R22 | 560 |
| Resistor R29 | 2.4K |
| Resistor R31 | 10 |
| Resistor R32 | 22K |
| Capacitors C1, C2 | 470 pf |
| Capacitors C3, C4, C5, C6 | 10 pf |
| Capacitor C7 | 0.1 f |
| Inductor L1 | 10 mh |
| All + voltages | +12 V |
| All − voltages | −20 V |

The above descriptions of several embodiments of this invention are given to illustrate this invention and it should be apparent that numerous modifications could be made without departing from the scope of the invention as claimed in the following claims.

We claim:

1. In combination:
   a scintillation camera comprising a single crystal scintillator, a plurality of photomultiplier tubes spaced from said scintillator with overlapping fields of view thereof, circuit means coupled to said photomultiplier tubes for producing coordinate electrical signals representing spatial coordinates of interaction of a gamma ray with said scintillator, and display means for displaying said electrical signals in the form of a spatially positioned dot of light, said camera having an inherent characteristic nonlinear spatial response such that a displayed map of a uniform spatial distribution of gamma rays interacting with said scintillator comprises a nonuniform spatial distribution of dots having a characteristic denser clustering of dots in regions of said map corresponding to locations of central areas of central ones of said photomultiplier tubes, said denser clustering being explained at least in part by the observed phenomenon that a gamma ray interaction at a particular location in said scintillator near the spatial position of a central axis of a particular one of said central photomultiplier tubes produces coordinate electrical signals representing an apparent location nearer said central axis of said particular photomultiplier tube; and signal correction circuitry coupled to the aforesaid circuit means and operative to produce corrected coordinate electrical signals representing more accurately said spatial coordinates of interaction comprising a plurality of correction signal generators, each being associated with one of said central ones of said photomultiplier tubes and operating in response to a gamma ray interaction in a portion of said scintillator near said associated photomultiplier tube to produce correction signals; and circuit means for combining said correction signals and said coordinate electrical signals to produce said corrected coordinate electrical signals.

2. An improved Anger-type scintillation camera comprising:

a scintillator;

nineteen photomultiplier tubes and preamplifiers therefor, said tubes viewing said scintillator and outputs from said preamplifiers being signals having amplitudes which vary inversely with the distance between the coordinate position of a particular tube and the coordinate position of an interaction of a gamma ray quantum with said scintillator;

computing circuitry coupled to said preamplifiers to produce an uncorrected set of signals, $+x$, $-x$, $+y$, $-y$, representing spatial coordinates of interaction of a gamma ray quantum with said scintillator;

a first pair of difference circuits receiving said uncorrected set of signals and producing a pair of uncorrected coordinate signals, $x,y$;

seven second pairs of difference circuits, each pair associated with one of a central seven of said photomultiplier tubes and having as differential inputs said pair of uncorrected coordinate signals, $x,y$ and a pair of reference signals representing coordinates of said associated photomultiplier tube, each pair also having as a gain control input a version of said output from said preamplifier for said associated photomultiplier tube and producing a set of coordinate correction signals $+xc$, $-xc$, $+yc$, $-yc$ for gamma ray interactions near said associated photomultiplier tube;

summing circuits for individually adding said coordinate correction signals $+xc$, $-xc$, $+yc$, $-yc$ to respective ones of said uncorrected set of signals, $+x$, $-x$, $+y$, $-y$, to produce a corrected set of signals $+x'$, $-x'$, $+y'$, $-y'$, said corrected set of signals more accurately representing spatial coordinates of a gamma ray quantum with said scintillator.

3. In combination:

an Anger-type scintillation camera comprising a scintillator, a plurality of photomultiplier tubes viewing said scintillator, circuit means coupled to said photomultiplier tubes for producing coordinate electrical signals representing spatial coordinates of interaction of a gamma ray with said scintillator, and display means for displaying said electrical signals in the form of a spatially positioned dot of light, said camera having an inherent characteristic nonlinear spatial response such that a displayed map of a uniform spatial distribution of gamma rays interacting with said scintillator comprises a nonuniform spatial distribution of dots having a characteristic denser clustering of dots in regions of said map corresponding to locations of central areas of central ones of said photomultiplier tubes, said denser clustering being explained at least in part by the observed phenomenon that a gamma ray interaction at a particular location in said scintillator near the spatial position of a central axis of a particular one of said central photomultiplier tubes produces coordinate electrical signals representing an apparent location nearer said central axis of said particular photomultiplier tube; and signal correction circuitry operative to produce corrected coordinate electrical signals representing more accurately said spatial coordinates of interaction comprising a plurality of correction signal generators, each being associated with one of said central ones of said photomultiplier tubes and operating in response to a gamma ray interaction in a portion of said scintillator near said associated photomultiplier tube to produce correction signals, and each employing a. a pair of difference circuits, each having inputs of a version of one of said pair of electrical signals and a fixed reference voltage of a magnitude corresponding to a respective coordinate of said axis of said associated photomultiplier tube and producing an output generally representing the difference therebetween; and b. a function generator having its output coupled to a gain control lead of each of said difference circuits to vary the gain of said circuits inversely with the magnitude of the distance between the coordinate location of said axis of said associated photomultiplier tube and the coordinate location of a gamma ray interaction with said scintillator; and circuit means for combining said correction signals and said coordinate electrical signals to produce said corrected coordinate electrical signals.

4. The combination as claimed in claim 3, wherein said function generator comprises circuit means deriving a gain control signal directly from an output signal from said associated photomultiplier tube.

5. The combination as claimed in claim 3, wherein said function generator comprises circuit means deriving a gain control signal from said fixed reference voltages and said pair of electrical signals.

6. In a scintillation camera having a single crystal scintillator, a plurality of photomultiplier tubes spaced from said scintillator with overlapping fields of view thereof, circuit means coupled to said photomultiplier tubes for producing coordinate electrical signals representing X and Y coordinates of interaction of a gamma ray with said scintillator in a rectilinear coordinate system, and display means for displaying said electrical signals in the form of a spatially positioned dot of light, the improvement comprising signal correction circuitry connected to said circuit means and operative to produce corrected coordinate electrical signals representing more accurately said spatial coordinates of interaction comprising a plurality of correction signal generators, each being associated with selected ones of said photomultiplier tubes and each operating in response to a gamma ray interaction in a portion of said scintillator near said associated photomultiplier tube to produce correction signals; and circuit means for combining said correction signals and said coordinate electrical signals to produce said corrected coordinate electrical signals.

7. In the scintillation camera of claim 6 the further improvement wherein said correction signal generators employ function generator means in conjunction with each interiorally located photomultiplier tube to produce the aforesaid correction signals in a strength that varies inversely with the magnitude of the distance between the coordinate location of the axis of an associated photomultiplier tube and the coordinate location of a gamma ray interaction with said scintillator and wherein threshold circuit means is associated with said function generator means to selectively prevent the generation of correction signals to those coordinate electrical signals having an amplitude strength less than a predetermined threshold setting.

* * * * *